(12) United States Patent
Lee et al.

(10) Patent No.: US 11,608,262 B2
(45) Date of Patent: Mar. 21, 2023

(54) NOZZLE FOR GASEOUS OR LIQUEFIED FUEL HAVING DELAY BETWEEN COUPLING AND ACTIVATION

(71) Applicant: Oasis Engineering (2003) Ltd, Tauranga (NZ)

(72) Inventors: Jonathan Jefcoate Lee, Papamoa (NZ); William John Fisher, Tauranga (NZ)

(73) Assignee: Oasis Engineering (2003) Ltd, Tauranga (NZ)

( * ) Notice: Subject to any disclaimer, the term of this patent is extended or adjusted under 35 U.S.C. 154(b) by 0 days.

(21) Appl. No.: 17/625,482

(22) PCT Filed: Jul. 16, 2020

(86) PCT No.: PCT/EP2020/070136
§ 371 (c)(1),
(2) Date: Jan. 7, 2022

(87) PCT Pub. No.: WO2021/009283
PCT Pub. Date: Jan. 21, 2021

(65) Prior Publication Data
US 2022/0267138 A1    Aug. 25, 2022

(30) Foreign Application Priority Data

Jul. 16, 2019 (EP) .................................. 19186456
Nov. 29, 2019 (DE) .................. 10 2019 132 411.4

(51) Int. Cl.
*B67D 7/42* (2010.01)
*F17C 13/04* (2006.01)
(Continued)

(52) U.S. Cl.
CPC ................ *B67D 7/42* (2013.01); *F16L 37/42* (2013.01); *F17C 5/06* (2013.01); *F17C 13/04* (2013.01);
(Continued)

(58) Field of Classification Search
CPC ........ B67D 7/42; B67D 7/344; B67D 7/3245; B67D 7/50; B67D 7/0294; F16L 37/42;
(Continued)

(56) References Cited

U.S. PATENT DOCUMENTS 4,638,842 A * 1/1987 Hawley .................... B67D 7/42
141/348
4,794,960 A * 1/1989 Hawley .................... B64F 1/28
141/113
(Continued)

FOREIGN PATENT DOCUMENTS

EP        0039977 A1 * 11/1981
EP        0039977 A1   11/1981
(Continued)

OTHER PUBLICATIONS

FR-2686680-A1 English Translation of Specification (Year: 2022).*
(Continued)

*Primary Examiner* — Timothy P. Kelly
*Assistant Examiner* — Stephanie A Shrieves
(74) *Attorney, Agent, or Firm* — Casimir Jones, S.C.; Brian F. Bradley (57) ABSTRACT

The invention relates to a nozzle, which has a main valve arranged in a channel, a coupling device (30) for producing a connection between the nozzle and the connecting piece (15), and an actuating apparatus (17) for actuating the coupling device and the main valve. The actuating apparatus comprises a manual lever (11), which is movable between a closed position and an open position. The actuating apparatus is designed to convert a movement of the manual lever in a region between the closed position and the open position to a temporally offset actuation of the coupling device and of the main valve. A coupling joint (20) connected to the manual lever is connected via operative connections to the
(Continued)

coupling device having the main valve. The operative connections for the coupling joint form a guide such that the coupling joint is caused to rotate about a first pivot axis (41) and/or to move in a first direction when the manual lever is activated in a first manual lever region, and that the coupling joint having the manual lever in a second manual lever region is caused to rotate about a second pivot axis (42) and/or to move in a second direction.

19 Claims, 6 Drawing Sheets

(51) Int. Cl.
*F16L 37/42* (2006.01)
*F17C 5/06* (2006.01)

(52) U.S. Cl.
CPC .......... F17C 2205/0376 (2013.01); F17C 2221/012 (2013.01); F17C 2223/0123 (2013.01); F17C 2250/043 (2013.01); F17C 2265/065 (2013.01); F17C 2270/0139 (2013.01)

(58) Field of Classification Search
CPC ......... F16L 37/44; F16L 37/40; F16L 37/413; F16L 37/00; F17C 13/04; F17C 5/06; F17C 2205/0376; F17C 2221/012; F17C 2223/0123; F17C 2250/043; F17C 2265/065; F17C 2270/0139; F17C 2205/037; F17C 2205/0373

USPC ........................................... 141/347
See application file for complete search history.

(56) References Cited

U.S. PATENT DOCUMENTS

| | | | | |
|---|---|---|---|---|
| 7,040,358 B2* | 5/2006 | Lacroix | ............... | B67D 7/42 |
| | | | | 141/206 |
| 8,863,791 B2* | 10/2014 | Aehle | ............... | F17C 5/02 |
| | | | | 141/348 |
| 9,527,720 B2* | 12/2016 | Clever | ............... | B67D 7/42 |
| 9,969,605 B2* | 5/2018 | Geipel | ............... | F17C 13/00 |
| 2008/0264516 A1* | 10/2008 | McGee | ............... | B67D 7/42 |
| | | | | 141/206 |
| 2009/0167019 A1* | 7/2009 | Weh | ............... | B67D 7/50 |
| | | | | 141/346 |
| 2017/0066644 A1* | 3/2017 | Törngren | ............... | B67D 7/04 |

FOREIGN PATENT DOCUMENTS

| | | | | |
|---|---|---|---|---|
| EP | 1006310 A2 | 6/2000 | | |
| EP | 1437543 B1 * | 7/2007 | ........... | B05B 12/002 |
| FR | 2686680 A1 * | 7/1993 | ............. | F16L 37/23 |
| WO | 2016168739 A1 | 10/2016 | | |

OTHER PUBLICATIONS

EP-1437543-B1 English Translation of Specification (Year: 2022).*
International Search Report & Written Opinion, Int'l Application No. PCT/EP2020/070136, dated Sep. 16, 2020.

* cited by examiner

NOZZLE FOR GASEOUS OR LIQUEFIED FUEL HAVING DELAY BETWEEN COUPLING AND ACTIVATION

The subject matter of the present invention relates to a filling nozzle for delivering a fluid into a tank. The filling nozzle has a first fluid connector which is connectable to a fluid infeed line, and a second fluid connector which is connectable to a connector port of the tank. A duct of the filling nozzle serves for directing the fluid from the first fluid connector to the second fluid connector. A main valve is disposed in the duct. The filling nozzle moreover comprises a coupling installation for establishing a connection between the filling nozzle and the connector port, as well as an activation device for activating the coupling installation and the main valve. The activation device comprises a hand lever which is movable between a closed position and an opened position.

Such filling nozzles are in particular used in so-called pressure fuelling in which a closed system between a fluid reservoir and the tank is established in that the filling nozzle is connected in a substantially fluid-tight manner to the connector port. The fluid in this instance can be introduced into the tank at a relative positive pressure without fluid being able to leak into the environment at the transition between the filling nozzle and the connector port. Filling nozzles of this type are used, for example, for delivering liquefied petroleum gas (LPG), compressed natural gas (CNG), liquefied natural gas (LNG), or else for delivering liquefied hydrogen (H2). It is desirable in particular for fuelling motor vehicles that the filling nozzles are easy to handle by the user, in particular with one hand, and in terms of the use thereof are ideally comparable to normal filling nozzles for delivering petroleum or diesel so that no familiarization is required.

Filling nozzles of this type are in principle known from documents EP 1 690 037 B1 or EP 1 883 766 B1. These known filling nozzles have a lever mechanism which is connected to the hand lever and which is specified for activating a coupling installation as well as a valve. The lever mechanism known from the prior art to this end comprises a plurality of lever elements by way of which a force exerted on the hand lever is converted so as to activate the coupling installation and the valve in a substantially simultaneous manner. It is disadvantageous in this prior art that the desired level of safety in fuelling is not always guaranteed in a simultaneous activation since the main valve may be opened before the connection to the connector port has been reliably established, for example. Moreover, a relatively high effort in terms of force is required for activating the hand lever, this impeding handling. Moreover, the known lever mechanism has many small parts and is thus prone to wear and complex in terms of construction.

A pressure fuelling nozzle which the user can tightly hold with one hand by a handle element is known from document EP 0 039 977, wherein an activation lever which the user can operate with the other hand is provided. The activation lever by way of a plurality of lever elements which are rotatably connected to one another is coupled to the main valve and to a coupling installation. Further filling nozzles of the type mentioned at the outset are known from documents WO 2016/168739 and EP 1 006 310.

Proceeding therefore, it is the object of the present invention to provide a filling nozzle of the type mentioned above which enables an activation of the main valve and of the coupling installation in a more simple and reliable manner.

This object is achieved by the features of claim 1. Advantageous embodiments are set forth in the dependent claims.

According to the invention, provision is made for the actuation device to be specified for converting a movement of the hand lever between the closed position and the opened position to a temporally offset activation of the coupling installation and the main valve.

First, some terms used in the context of the invention will be explained. The filling nozzle can be connected to a connector port of the tank, for example in that the second fluid connector is placed on the connector port. A fluid-tight connection between the connector port and the second fluid connector is preferably established when connecting, wherein the filling nozzle furthermore preferably is configured for pressure fuelling the tank. The fluids to be delivered may be, for example, LPG, LNG, CNG and/or H2. The coupling installation serves for establishing the connection; the coupling installation can in particular serve for locking the second fluid connector to the connector port so as to prevent any inadvertent release after the connection has been established.

The activation device has a hand lever. The hand lever serves for activating the filling nozzle and by a user who holds the filling nozzle in his/her hand can usually be moved from a closed position to an opened position with the aid of the manual force, in particular in that the hand lever with the aid of the fingers is pulled towards the thenar.

The closed position of the hand lever describes a position of the lever (resting position) which correlates to a closed main valve. A fuelling procedure is usually triggered by moving (preferably pulling) the hand lever to the opened position, wherein the coupling installation and the main valve can be activated to this end in order for the filling nozzle to be coupled to a connector port and for the main valve to be opened, as is explained in the context of the present disclosure. However, the main valve is not mandatorily opened when the hand lever is located in the opened position. In particular, an automatic safety switch off which in principle is known from the prior art may be present, said automatic safety switch off being specified for moving the main valve to a closed position independently of the position of the hand lever. Such a safety switch off is known from EP 2 386 520 A1, for example.

The range of movement of the hand lever according to the invention has a first hand lever range and a second hand lever range which is dissimilar to the first hand lever range. The term "first" and "second" is not to be associated with any established arrangement of the ranges in relation to the closed position and the opened position.

The main valve and the coupling installation can be activated with the aid of the activation device. Activating the main valve can comprise the opening and/or the closing of the main valve, for example. Activating the coupling installation can in particular comprise the establishing and/or the releasing of a connection, or the establishing and/or the releasing of the above mentioned locking mechanism, respectively, between the second fluid connector and the connector port. Activating the coupling installation or the main valve, respectively, may also lie in that elements of the activation device are set in movement by the movement of the hand lever so as to enable later activation of the coupling installation or of the main valve, respectively.

It has been recognized in the context of the invention that a temporally offset activation of the coupling installation and of the main valve significantly enhances the user-friendliness and fuelling safety. It can be ensured on account thereof on the one hand that activating of the main valve takes place only once the coupling installation has been safely activated. It can thus in particular be ensured, for example, that the main valve is opened only once the locking mechanism has been safely established, or that the locking mechanism is opened only once the main valve has been reliably closed. It has furthermore been recognized that the force acting on the hand lever at a specific point in time in the case of a temporally offset activation can be converted in a substantially complete manner to the respective activation of the coupling installation, or of the main valve, respectively, on account of which the handling is facilitated.

According to the invention, the activation device has a coupling joint which is connected to the hand lever and which by way of a first operative connection is connected to the coupling installation, and by way of a second operative connection is connected to the main valve, wherein the operative connections for the coupling joint form a guide such that the coupling joint when activating the hand lever in a first hand lever range is initiated to rotate about a first pivot axis and/or to displace in a first direction, and such that the coupling joint when activating the hand lever in a second hand lever range is initiated to displace in a second direction and/or to rotate about a second pivot axis.

The coupling joint in this preferred embodiment is connected to the hand lever, on the one hand, and by way of the two operative connections connected to the coupling installation and the main valve, on the other hand. The term "operative connection" in principle comprises any type of coupling which is suitable for converting a movement of the coupling joint to an activation of the coupling installation, or of the main valve, respectively. The operative connections serve for transmitting an activation force exerted on the hand lever and coupling joint to the coupling installation, or to the main valve, respectively, on the one hand. On the other hand, the operative connections for the coupling joint form a guide and on account thereof, when activating the hand lever in the first or the second hand lever range, respectively, initiate the coupling joint to rotate about the first or the second pivot axis, respectively, and/or to displace in the first or the second direction, respectively. This means that the coupling joint when activating the hand lever in the respective hand lever range is either rotated about the respective pivot axis relative to the filling nozzle, or is disposed in the respective direction relative to the filling nozzle, or else is rotated about the respective axis as well as displaced in the respective direction. The first pivot axis herein is dissimilar to the second pivot axis. The first direction is dissimilar to the second direction. When the coupling element in an activation of the hand lever in one of the hand lever ranges is displaced as well as rotated, relocating of the pivot axis arises by virtue of the displacement. As long as the pivot axis herein does not change the position thereof relative to the coupling joint, the rotation of the coupling joint in the context of the invention is understood to be a rotation about a first pivot axis. Rotating about another pivot axis takes place only once the position of the pivot axis in relation to the coupling joint has changed.

It is preferable for the coupling joint to be in each case rotatable about exactly one first pivot axis or exactly one second pivot axis, respectively. However, in the context of the invention it is in principle also possible for the coupling joint during the activation of the hand lever in the first hand lever range to be rotated about a plurality of first pivot axes and/or to be displaced in a plurality of first directions, wherein it can moreover be provided that the coupling joint during the activation of the hand lever in the second hand lever range is rotated about a plurality of second pivot axes and/or is displaced in a plurality of second directions. The quantity of first pivot axes and the quantity of second pivot axes herein are preferably disjoint (thus unrelated to the element). The quantity of first directions and the quantity of second directions herein are likewise preferably disjoint.

It has been recognized that a temporally offset activation of the coupling installation and the main valve is enabled in a particularly efficient manner on account of the use of a coupling joint described above. This embodiment offers significant advantages in particular in relation to solutions having fixed pivot axes, as is known from the prior art. The force exerted on the hand lever can thus be converted in a particularly effective manner, first to an activation of the coupling installation when passing through the first hand lever range and to an activation of the main valve when passing through the second hand lever range, for example.

The operative connections herein can be configured such that the rotation of the coupling joint about the first pivot axis and/or the displacement of the coupling joint in the first direction are/is at least partially or completely converted to an activation of the coupling installation. The operative connections can furthermore be configured such that the rotation of the coupling joint about the second pivot axis and/or the displacement of the coupling joint in the second direction are/is at least partially or completely converted to an activation of the main valve. On account thereof, a movement of the hand lever in the respective hand lever range can in each case be substantially completely converted to the respective activation of the coupling installation or of the main valve, respectively. As opposed thereto, in the use of a normal lever mechanism known in the prior art, a substantially simultaneous activation of the coupling installation and of the main valve takes place such that a higher activation force has to be applied.

The filling nozzle can have means for guiding the coupling element relative to a housing of the filling nozzle. Additionally or alternatively to the operative connections, said means can form a guide for a movement of the coupling joint relative to the housing. The means can have a guide pin which is fixed to the housing and which engages in an elongate bore which is configured in the coupling joint. On account thereof, it is possible for the coupling joint to be pivotable about an axis formed by the guide pin, for example, or to be configured so as to be displaceable relative to the guide pin along a direction which is predefined by the elongate bore.

In one preferred embodiment, at least one of the operative connections has a relaying element which is connected in an articulated manner to the coupling joint. The relaying element is preferably initiated to displace relative to the filling nozzle by a movement of the coupling joint. Additionally or alternatively, the relaying element can also be initiated to rotate relative to the filling nozzle by a movement of the coupling joint. The relaying element herein can be displaceable relative to the filling nozzle in a linear manner, for example, or be articulated so as to be rotatable on the filling nozzle. It has been demonstrated that guiding of the coupling joint relative to the filling nozzle can be enabled in a simple and efficient manner by way of such a relaying element. On the one hand, the coupling joint can be rotated relative to the relaying element such that the rotating capability of the coupling joint about one of the pivot axes can be implemented, for example. At the same time, the displacing capability of the coupling joint in one of the directions can be implemented by way of the displacing capability of the relaying element.

In one preferred embodiment, both operative connections have such a relaying element. The relaying element that is associated with the first operative connection in this case can enable the rotating capability of the coupling joint about the first pivot axis, or the displacing capability of the coupling joint in the first direction, wherein the second relaying element can enable the rotating capability about the second pivot axis, or the displacing capability along the second direction, respectively.

It can be provided that the relaying element has an activation slide which is displaceable in a linear manner relative to the filling nozzle, as well as a joint element which connects in an articulated manner the coupling joint to the slide. The joint element can be fastened in an articulated manner on the slide and/or in an articulated manner on the coupling joint.

In one preferred embodiment, the filling nozzle has an installation which delimits the displacing capability and/or the rotating capability of the relaying element such that the relaying element by a movement of the coupling joint is displaceable and/or rotatable only to a terminal position, wherein the coupling joint preferably upon reaching the terminal position is prevented from further rotating about the first or the second pivot axis, and/or is prevented from further displacing along the first or the second direction. The installation can be configured as a detent face, for example, on which the relaying element or an element connected to the relaying element impacts such that further movement of the relaying element is no longer possible upon impact. The coupling joint is preferably prevented from further rotating about the first or the second pivot axis once the relaying element has reached the terminal position. Additionally or alternatively, it can be provided that the coupling joint is prevented from further displacing along the first or the second direction once the relaying element has reached the terminal position. The use of such an installation represents an advantageous possibility for achieving a transition between the different modes of movement of the coupling joint. The installation which delimits the displacing capability can in particular be disposed such that reaching the terminal position of the relaying element is associated with the hand lever transitioning from the first hand lever range to the second hand lever range.

In one preferred embodiment, the relaying element is connected to the restoring element, wherein the restoring element facilitates or impedes pivoting of the coupling element about the first or the second pivot axis. Alternatively or additionally, the relaying element can be connected to a restoring element, wherein the restoring element facilitates or impedes displacing of the coupling joint in the first or the second directions. The use of restoring elements can likewise be utilized for enabling a transition between the different modes of movement of the coupling joint. For example, when both operative connections have a relaying element which is loaded by a restoring element, the restoring forces can be set such that a first mode of movement of the coupling joint initially takes place in a movement of the hand lever in the first hand lever range, wherein a transition to the second mode of movement takes place when the hand lever transitions to the second hand lever range. In one advantageous embodiment, the restoring element or the restoring elements can be configured for urging the main valve to the closed position thereof.

In one embodiment, the coupling installation in a displacement of the second fluid connector in the direction of the connector port is configured for establishing automatic locking between the second fluid connector and the connector port, wherein the activation device in a movement of the hand lever from the opened position to the closed position is preferably configured for first activating the main valve and for subsequently releasing the locking mechanism between the second fluid connector and the connector port. In this design embodiment, a user can connect the filling nozzle to the connector port in that he/she disposes the second fluid connector so as to be only approximately coaxial with the connector port, and subsequently moves the filling nozzle in the direction of the connector port without other manipulations having to be performed by the user (hereunder also referred to as "automatic locking"). To this end, the coupling installation can in particular have radially displaceable locking elements which are configured for engaging in a recess of the connector port.

As opposed thereto, locking between the filling nozzle and the connector port in the filling nozzles known from EP 1 690 037 B1 or EP 1 883 766 A1 is established only by activating the hand lever. This impedes the operation of the filling nozzle known from the prior art, since the user has to perform two actions simultaneously, specifically the correct disposal of the fluid connector on the connector port and simultaneously the activation of the hand lever. The use of "automatic locking" per se is indeed known from the prior art. In the case of filling nozzles with "automatic locking" it has to date however not been possible for said filling nozzles to be activated with one hand. Rather, while holding the filling nozzle in one hand, the locking mechanism had to be released by the user by means of his/her second hand. Only the present invention enables the locking mechanism to be released with one hand in that, on account of the temporally offset activation of the main valve and of the coupling installation in the movement of the hand lever from the opened position to the closed position, the main valve can first be closed and the locking mechanism can be released in a temporally offset manner.

It can preferably be furthermore provided that the activation device in a movement of the hand lever from the closed position to the opened position is configured for first preparing the release of the locking mechanism and for subsequently activating the main valve. Since the locking mechanism in this embodiment is automatically established when the filling nozzle is placed, the movement of the hand lever from the closed position to the opened position does not have to be used for establishing the locking mechanism but can rather be used for preparing said locking mechanism to be released at a later stage. Such a preparation of the release of the locking mechanism can lie in that a latching element of the activation device latches in a counter-latching element of the coupling installation, for example, such that the counter-latching element in a subsequent movement of the hand lever from the opened position to the closed position can be entrained by the latching element so as to cause the locking mechanism to be released.

In one preferred embodiment, the relaying element therefore comprises a latching element which is capable of latching in a counter-latching element of the coupling installation. The latching can take place in the context of an activation of the coupling installation and be achieved in particular by displacing the relaying element. On account thereof, it is possible for the latching element to entrain the counter-latching element in a subsequent displacement of the relaying element in the opposite direction. The entrainment of the counter-latching element can likewise take place in the context of the activation of the coupling installation.

In one alternative embodiment, the coupling installation is capable of being placed on the connector port by displacing the second fluid connector in the direction of the connector port, wherein, upon placing the coupling installation on the connector port, the activation device when moving the hand lever from the closed position to the opened position is configured for first establishing a locking mechanism between the second fluid connector and the connector port, and for subsequently activating the main valve, in particular for opening the main valve. On account of the temporally offset activation of the coupling installation and the main valve, the complete manual force applied by the user in a first hand lever range can be used for establishing the locking mechanism of the second fluid connector on the connector port. In the second hand lever range, the complete manual force applied by the user can subsequently be converted for activating, in particular opening, the main valve. The manual force to be applied by the user for establishing the locking mechanism as well as for opening the main valve is therefore significantly reduced in comparison to the prior art.

The hand lever and the coupling joint are preferably connected to one another in a rotationally fixed manner. The hand lever and the coupling joint are particularly preferably connected to one another in an integral manner. In the case of a rotationally fixed or integral connection, respectively, forces exerted on the hand lever can be transmitted to the coupling joint in a particularly effective manner, and thus be used directly and in a force-saving manner for activation.

A subject matter of the present invention also relates to a fuelling pump which has a pump nozzle according to the invention.

Advantageous embodiments of the invention will be explained in an exemplary manner hereunder with reference to the appended drawings in which.

Figure 1:
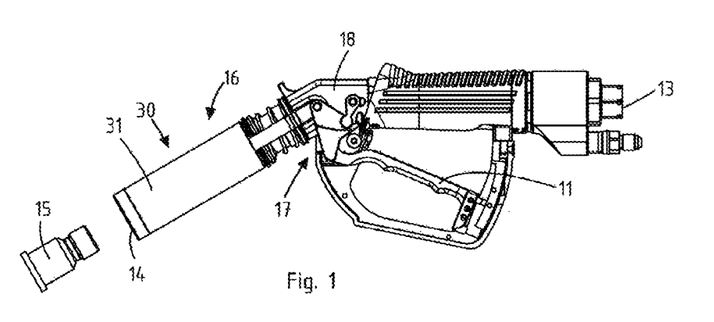
FIG. 1 shows a first embodiment of a fuelling nozzle according to the invention in a lateral view.

FIG. 1 shows a filling nozzle according to the invention in a lateral view prior to establishing a connection to a connector port 15. The filling nozzle at the rear end thereof has a first fluid connector 13 which can be connected to a filling hose (not shown), for example. The filling nozzle at the front end comprises an outflow pipe 16 having a second fluid connector 14. The second fluid connector 14 can be connected to the connector port 15 with the aid of a coupling installation 30. The filling nozzle comprises a housing 18, a duct for directing the fluid from the first fluid connector 13 to the second fluid connector 14 extending within said housing 18. A main valve by way of which the flow through the duct can be controlled is disposed in the duct, said main valve not being visible in this view.

The filling nozzle furthermore has an activation device 17 with the aid of which the main valve and the coupling device 30 can be activated. The activation device 17 comprises inter alia a hand lever 11 which in FIG. 1 is located in the closed position. The activation device 17 will be explained in more detail further below.

Figure 2A:
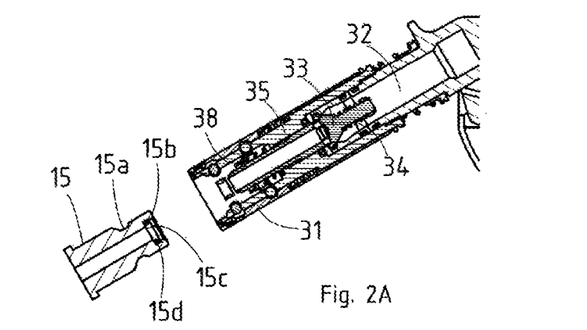
FIG. 2A shows a lateral sectional view through the outflow pipe of the filling nozzle according to the invention of FIG. 1 prior to establishing the connection to a connector port.
Figure 2B:
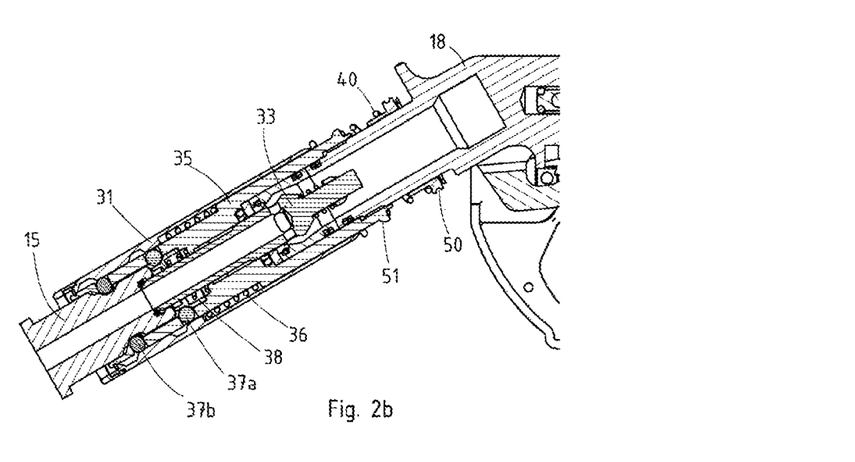
FIG. 2B shows a lateral sectional view through the outflow pipe of the filling nozzle according to the invention of FIG. 1 upon establishing the connection to a connector port.

Enlarged sectional views of the outflow pipe 16 for the detailed description of the coupling device 30 located on the outflow pipe 16 are shown in FIGS. 2A and 2B. FIG. 2A shows the state prior to establishing a connection to the connector port 15. FIG. 2B shows the state upon establishing said connection.

A duct 32 for directing the fluid runs within the outflow pipe 16. The duct 32 can be closed by a sealing element 33 which is connected to a sliding element 38. The sealing element 33 in FIG. 2A is preloaded to the closed position by a spring 34.

The coupling installation 30 comprises a stator 35 which is fixedly screwed to the housing 18. The stator 35 is circumferentially surrounded by an external sleeve 31 which is displaceable relative to the stator 35 and which by a spring 36 is urged towards the front end of the outflow pipe 16. Recesses in which locking elements 37a, 37b can engage are disposed in the external sleeve 31 as well as in the stator 35. Prior to establishing the connection (FIG. 2A), the locking elements 37a, 37b block any movement of the sleeve 31 relative to the stator 35.

When placing the fluid connector 14 on the connector port 15, a front face 15b of the connector port 15 comes in contact with the sliding element 38. On account thereof, the sliding element 38 is displaced towards the rear end of the outflow pipe 16. The sealing element 33 which is connected to the sliding element herein is likewise displaced and releases the duct 32. The connector port 15 moreover has a sealing component 15d having a sealing face 15c. The sealing face 15c by way of the front end of the sealing element 33 seals when the connector port 15 is placed (see FIGS. 2a and 2b).

At the same time, the locking elements 37a by virtue of the displacement of the sliding element 38 can yield towards the inside such that the external sleeve 31 is released and by the force of the spring 36 is disposed relative to the stator 35 towards the front end of the outflow pipe 16. As the placing of said connector port 15 continues, the locking elements 37b make their way into the recess 15a of the connector port 15 such that the latter is locked relative to the stator 35 (see FIG. 2B). The fluid connector 14 on account thereof is securely fastened to the connector port 15 such that a fluid to be delivered can be reliably directed through the duct 32 into the connector port 15 and into a tank connected to the latter.

Figure 3:
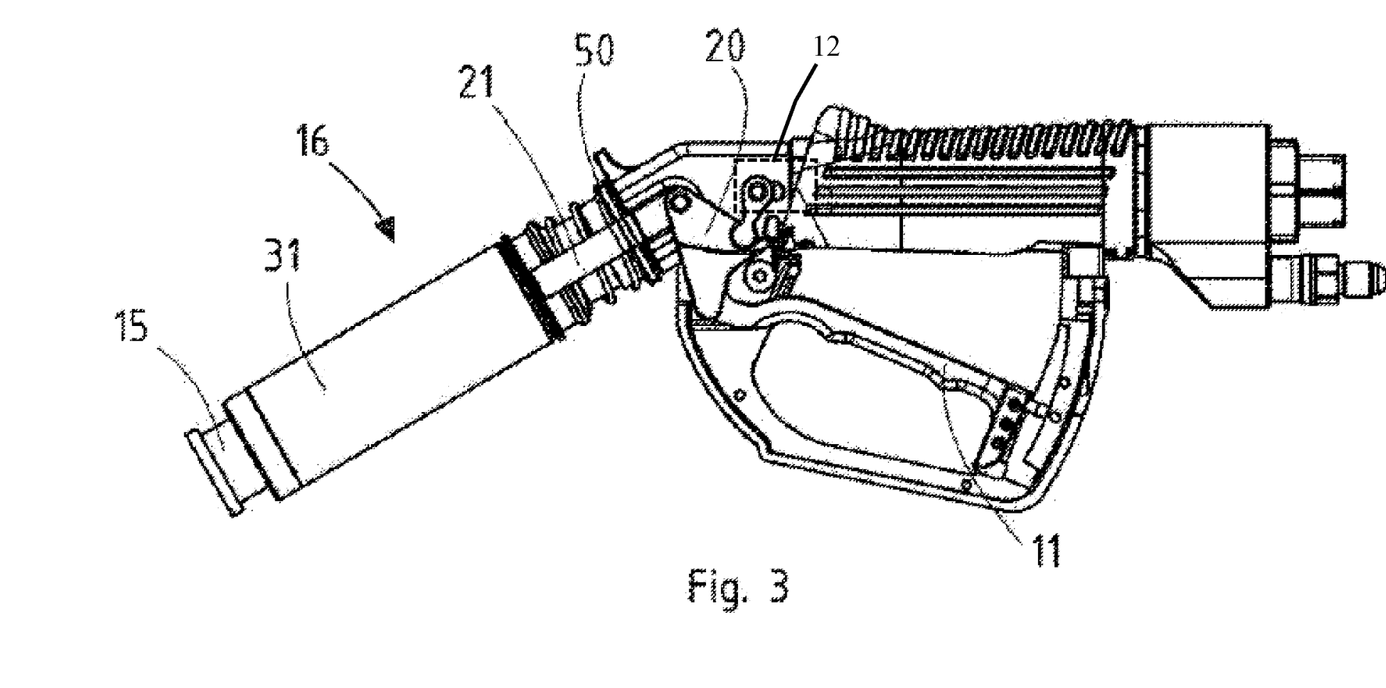
FIG. 3 shows the filling nozzle according to the invention of FIG. 1 upon establishing a connection to a connector port.

FIG. 3 shows the filling nozzle in the view of FIG. 1 upon establishing the connection to the connector port 15. It can be seen in comparison to FIG. 1 that the external sleeve 31 has been displaced towards the front end of the outflow pipe. On account of this displacement, the locking elements 37b are held in the locking position by the external sleeve 31, the connector port being locked to the fluid connector 14 in said locking position (see FIG. 2B).

Figure 4:
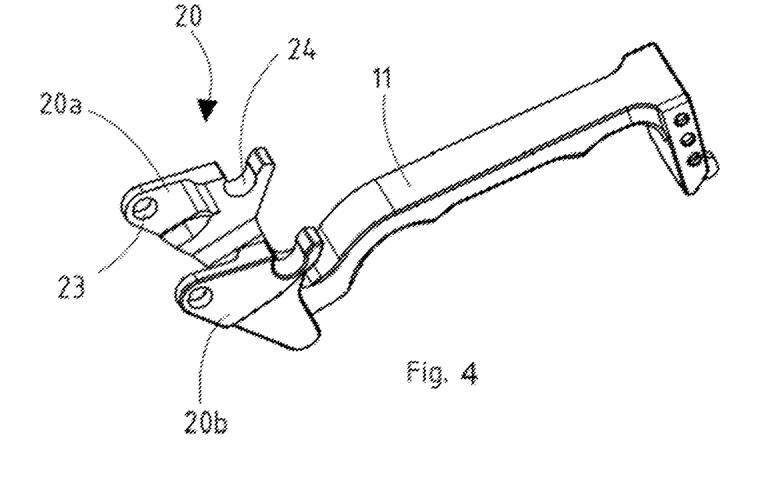
FIG. 4 shows a three-dimensional view of a hand lever according to the invention and of a coupling joint connected to the latter.
Figure 5:
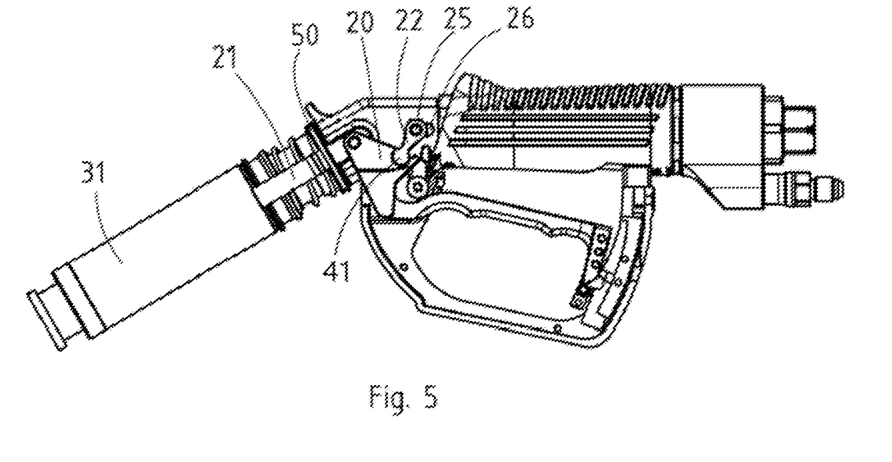
FIG. 5 shows the filling nozzle according to the invention of FIG. 1 once the hand lever has been moved from a closed position to an intermediate position.
Figure 6A:
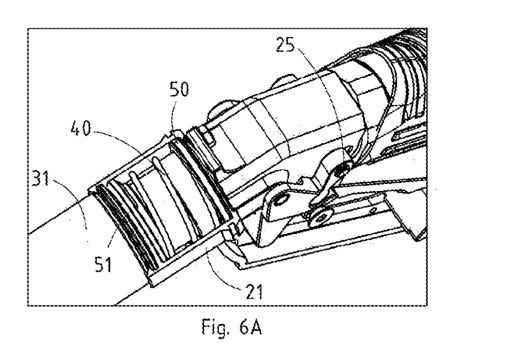
FIG. 6A shows a three-dimensional enlarged view of a fragment of the embodiment of FIG. 5.
Figure 6B:
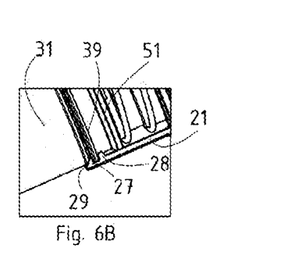
FIG. 6B shows a three-dimensional view of a fragment of the embodiment of FIG. 5.
Figure 7:
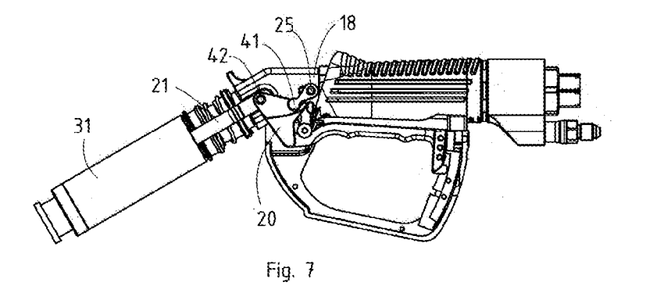
FIG. 7 shows the filling nozzle according to the invention of FIG. 1 once the hand lever has been moved to an opened position.

The design embodiment of the activation mechanism will be explained in more detail hereunder by means of FIGS. 3 to 7. FIG. 4 herein shows a three-dimensional lateral view of sub-elements of the activation device according to the invention. FIGS. 5 and 7 show lateral views of the filling nozzle according to the invention in various states of the activation device. FIGS. 6A and 6B show three-dimensional views of fragments of the filling nozzle according to the invention.

The activation device 17 comprises a hand lever 11 which is integrally connected to a coupling joint 20. As can be seen in FIG. 4, the coupling joint 20 is constructed from two symmetrically disposed halves 20a, 20b which therebetween enclose the housing 18. Only one half of the coupling joint 20 can be seen in the lateral views of FIGS. 3, 5, and 6. For reasons of simplicity, only that half of the activation device that can be seen in the lateral views is in each case described hereunder.

The coupling joint 20 by way of a first operative connection is connected to the coupling installation 16 and by way of a second operative connection is connected to the main valve.

The first operating connection comprises a traction hook 21 which is laterally mounted so as to be displaceable on the filling nozzle. The traction hook 21 is mounted so as to be displaceable along the axis of the outflow pipe 16. The coupling joint 20 has through bores 23 by way of which the traction hook 21 is connected in an articulated manner to the coupling joint 20. The traction hook 21 represents a relaying element in the context of the present invention. The traction hooks 21 at the rear ends thereof are mounted on a ring 50 which is displaceable along the axis of the outflow pipe 16. The ring 50 is preloaded by a spring 40 which urges the ring, conjointly with the traction hook 21 mounted thereon, towards the rear end of the filling nozzle. The spring 40 can thus be considered to be an exemplary restoring element in the context of the present invention which is connected to a relaying element (presently to the traction hook 21).

The second operative connection comprises an articulated lever 22, the first end thereof being inserted in a recess of the coupling joint 20. The first end of the articulated lever can roll in a sliding manner within the recess 24 and is thus connected in an articulated manner to the coupling joint 20 in this way. The articulated lever 22 at the other end thereof is connected in an articulated manner to a valve activation pin 25. The valve activation pin 25 is mounted in a gate 26 located within the housing 18 so as to be displaceable relative to the housing. The main valve 12 (FIG. 3) can be opened or closed, respectively, by displacing the valve activation pin 25. The main valve 12 with the aid of a restoring element (not shown) is preloaded to the closed position. The valve activation pin 25 which is connected to the main valve 12 is also urged to the closed position of said valve activation pin 25 by this restoring element, the valve activation pin 25 being located in said closed position in FIG. 3. The main valve 12 can be opened by being displaced in the direction of the first fluid connector 13 within the gate 26. The combination of the articulated lever 22 and the valve activation pin 25 forms a relaying element in the context of the present invention. The valve activation pin 25 can be considered to be a displaceable activation slide in the context of the invention FIG. 5 shows a lateral view of the filling nozzle according to the invention, in which the hand lever 11 has been moved from the closed position shown in FIG. 3 to an intermediate position located between the closed position and the opened position. The range of movement of the hand lever 11 between the closed position shown in FIG. 3 and the intermediate position shown in FIG. 5 represents a first hand lever range in the context of the present invention.

By moving the hand lever 11 in this first hand lever range, the coupling joint 20 is initially rotated about a first pivot axis 41 (see FIG. 5) which is substantially perpendicular to the drawing plane of FIGS. 3 and 5 and which runs approximately through the centre of the recesses 24 of the coupling joint 20. At the same time, a displacement of the coupling joint 20 predefined by the guiding of the traction hooks 21 as well as of the articulated lever 22 takes place, such that the position of the pivot axis 41 is relocated in the course of the movement of the hand lever 11 in the first hand lever range. The pivot axis 41 herein moves in an approximately circular manner about the valve activation pin 25. This circular relocation of the pivot axis 41 is caused by the articulated connection of the articulated lever 22 on the valve activation pin 25. However, the pivot axis 41 remains fixed relative to the coupling joint. The combined rotation and displacement of the coupling joint 20 leads to a displacement of the traction hooks 21 in the direction of the front end of the outflow pipe 16. The displacement of the traction hooks 21 takes place counter to the tensioning force of the spring 40.

It can be seen in FIGS. 6A and 6B that the traction hooks 21 at the front ends thereof have an oblique face 29, a latching element 27, as well as a detent element 28. An encircling protrusion 39 is moreover disposed at the rear end of the external sleeve 31. An outwardly projecting oblique face 51 of the stator 35 (see also FIG. 2B) is moreover located in the axial direction behind the protrusion 39. During the displacement of the traction hooks 21 caused by the rotation of the coupling joint 20, the oblique face 29 runs externally on the protrusion 39 such that the front end of the traction hooks 21 is widened in an outward manner. Upon a specific displacement, the latching element 27 latches behind the protrusion 39. Moreover, the detent element 28 impacts the rear end of the protrusion 39 such that any further displacement of the traction hooks 21 towards the front end is prevented. The latched state is shown in FIGS. 5, 6A, and 6B. Since the traction hooks 21 cannot be further displaced towards the front end, the coupling joint 20 is also prevented from being further displaced or rotated, respectively.

FIG. 7 shows a lateral view of the filling nozzle according to the invention, in which the hand lever 11 has been moved from the intermediate position shown in FIG. 5 to an opened position. The range of movement of the hand lever 11 between the intermediate position shown in FIG. 5 and the opened position shown in FIG. 7 represents a second hand lever range in the context of the present invention.

Since any further displacement or rotation, respectively, of the coupling joint 20 is prevented on account of the traction hooks impacting on the detent element 28, the coupling joint 20 in a movement of the hand lever 11 in this second hand lever range is rotated about a second pivot axis 42 which is substantially perpendicular to the drawing plane of FIGS. 3, 5, and 7 and which runs approximately through the centre of the through bores 23 of the coupling joint 20. On account of the activation of the hand lever 11 in the second hand lever range the coupling joint 20 is thus initiated to rotate about the pivot axis 42, said rotation in turn being converted to a rotation and displacement of the articulated lever 22 as well as to displacement of the valve activation pin 25 in the direction of the first fluid connector 13. On account thereof, the main valve is moved, counter to the force of the restoring element thereof, from the closed position to the opened position. The fluid to be delivered can in this state be conveyed from the liquid connector 13 through the duct as well as through the opened main valve by way of the outlet pipe into the connector port which is connected to the latter.

It can be provided that the hand lever is capable of being blocked in the opened position (not shown here) so as to hold the hand lever as well as the main valve in the opened position.

Upon completion of the fuelling procedure the hand lever can be moved from the opened position back to the closed position in that a potentially existing blocking mechanism is released and the manual force exerted by the user is reduced. The hand lever in this instance initially passes through the second hand lever range and subsequently the first hand lever range, specifically in each case in the reverse direction. A rotation of the coupling joint 20 about the second pivot axis 42 initially takes place in the movement of the hand lever in the second hand lever range from the opened position to the intermediate position. Associated with said movement, the articulated lever 22 is rotated and the valve activation pin 25 is displaced towards the front end of the filling nozzle such that the main valve is closed. The movement described above is caused by the restoring element of the main valve, the former urging the latter to the closed position.

The subsequent movement of the hand lever from the intermediate position to the closed position (first hand lever range) is caused by the spring 40 which retracts the traction hooks 21 conjointly with the external sleeve 31 latched to the latter towards the rear end of the filling nozzle, wherein a displacement of the coupling joint 20 as well as a rotation of the coupling joint 20 about the first pivot axis 41 simultaneously takes place in a sequence which is reversed in comparison to the sequence already described above. On account of the retraction of the external sleeve 31, the locking elements 37a, 37b can yield in an outward manner into the recesses of the external sleeve such that the connector port 15 is released. After the connector port has been released, the traction hooks 21 are retracted even further rearwards such that the detents 28 of the traction hooks 21 reach the oblique face 51 of the stator 35 already described above and run onto said oblique face 51. The traction hooks 21 herein are widened in an outward manner and on account thereof are lifted from the latching mechanism with the protrusion 39 of the external sleeve 31. The external sleeve 31 is then again freely displaceable along the outflow pipe and in a subsequent connecting procedure can again be locked to a connector port as has been described above.

Figure 8:
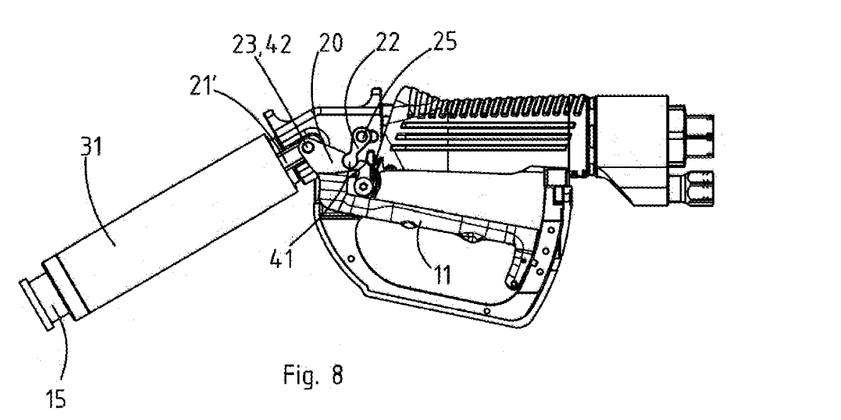
FIG. 8 shows an alternative embodiment of a filling nozzle according to the invention in a lateral view.
Figure 9:
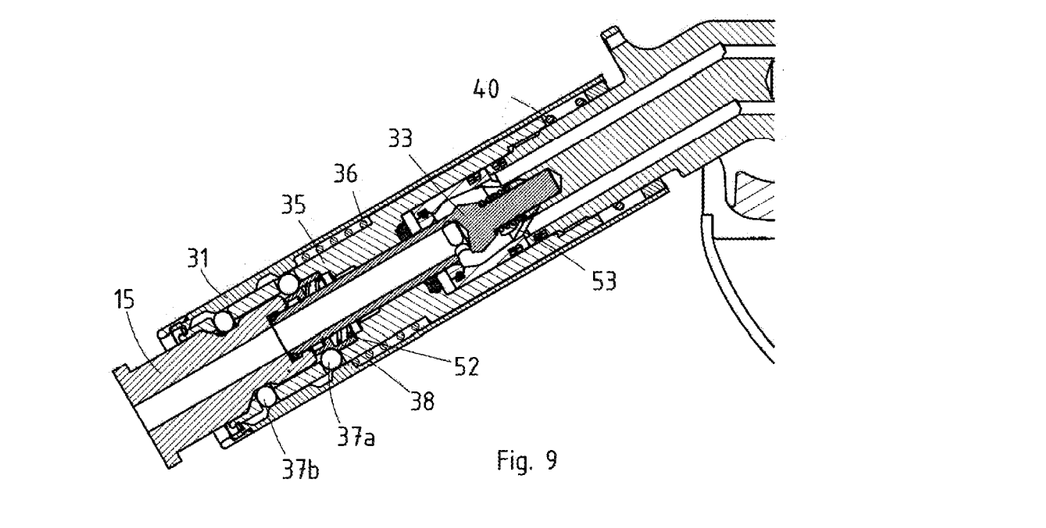
FIG. 9 shows a lateral sectional view through the outflow pipe of the filling nozzle according to the invention of FIG. 8 upon establishing the connection to a connector port.

FIG. 8 shows an alternative embodiment of a filling nozzle according to the invention in a lateral view. FIG. 9 shows a lateral sectional view of the outflow pipe of the second embodiment. Elements which have already been described in the context of the first embodiment are provided with the same reference signs and will not be explained in detail yet again hereunder. Only the points of differentiation between the embodiments are to be described hereunder.

As opposed to the first embodiment, the second embodiment is not configured for establishing automatic locking between the second fluid connector 14 and the connector port 15 when the second fluid connector 14 is displaced in the direction of the connector port 15. Locking upon placing in the case of this embodiment takes place only in that the external sleeve 31 by a movement of the hand lever in the first hand lever range is moved from the closed position in the direction of the opened position. As opposed to the second embodiment, traction hooks 21' in this embodiment are fixedly connected to the external sleeve 31.

When the fluid connector 14 is placed on the connector port 15, the sliding element 38, as is the case in the first embodiment (cf. FIGS. 2A and 2B), counter to the restoring force of a spring 52 is displaced rearwards, and the sealing element 33 counter to the restoring force of the spring 53 is moved out of the closed position of said sealing element 33 (see FIG. 9). The locking elements 37a, 37b can then yield towards the inside so that the external sleeve can be displaced along the outflow pipe. When the hand lever in the first hand lever range is then activated from the closed position in the direction of the opened position, the external sleeve 31 is displaced forwards by way of the traction hooks 21'. On account thereof, the fluid connector is locked to the connector port (see FIG. 9). As is the case in the first embodiment, a combined displacement and rotation of the coupling joint 20 takes place during the displacement of the traction hooks 21' towards the front, said combined displacement and rotation being initiated by the operative connections already described above as well as by the guiding action for the coupling joint formed on account thereof.

The external sleeve 31 in the locked position cannot be displaced further towards the front such that further displacement of the coupling joint 20 and thus of the pivot axis 42 towards the front end cannot take place in any further activation of the hand lever. When the hand lever 11 in the second hand lever range is now moved further in the direction of the opened position, the coupling joint 20 is pivoted about the pivot axis 42, the articulated lever 22 is activated, and the main valve is opened, as has already been described above in the context of the first embodiment.

Figure 10:
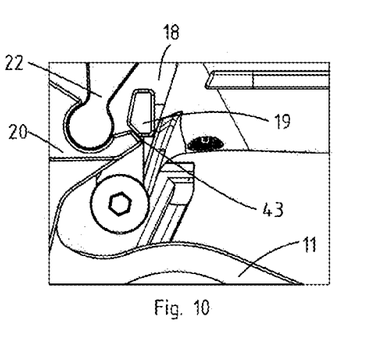
FIG. 10 shows an enlarged lateral view of a sub-region of the embodiment of FIG. 8, wherein a state prior to establishing the locking mechanism is shown.

FIG. 10 shows an enlarged lateral view of a fragment of FIG. 8 prior to establishing a locking mechanism between the fluid connector 14 and the connector port 15. Part of the articulated lever 22, of the hand lever 11, of the coupling joint 20, as well as of the housing 18 can be seen in this view. It can furthermore be seen that a detent 19 on which a cam 43 of the coupling joint 20 bears is disposed on the housing 18. When a force is exerted on the hand lever 11 in this state of the activation device 17 (in which the hand lever 11 is located in the closed position), the detent 19 by virtue of being in contact with the cam 43 blocks any movement of the hand lever 11. It is ensured on account thereof that the main valve cannot be opened as long as the fluid connector 14 has not been connected in an orderly manner to the connector port 15.

The locking elements 37a are enabled to yield towards the inside such that the external sleeve 31 by way of the activation device 17 can be displaced relative to the stator 35 towards the front end of the outflow pipe and by way of the locking elements 37b locks the connector port 15 to the stator 35 only by placing the fluid connector 14 in an orderly manner on the connector port 15, as has been explained above. When the hand lever 11 is activated in the first hand lever range, the coupling joint 20 by means of the combined rotation and displacement described above can be pivoted past the detent 19 only on account of the external sleeve 31 being thus released. The safeguard in relation to any undesired opening of the main valve prior to the locking mechanism being established, as has presently been described in the context of the embodiment of FIGS. 8 and 9, can also be implemented in an analogous manner in conjunction with the embodiment as per FIGS. 1 to 7.

Figure 11:
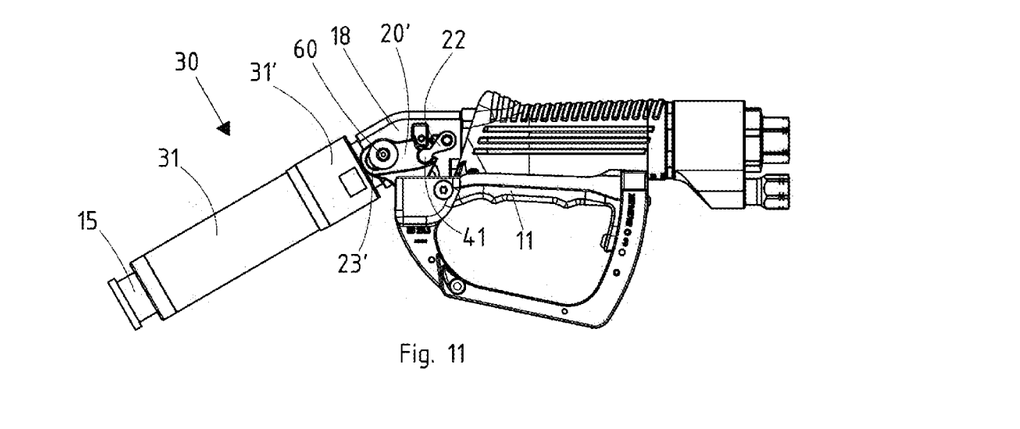
FIG. 11 shows a further alternative embodiment of a filling nozzle according to the invention in a lateral view.
Figure 12:
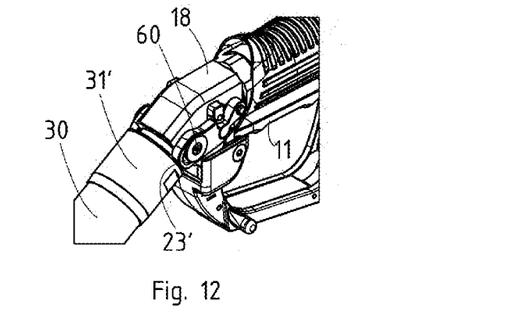
FIG. 12 shows a three-dimensional enlarged view of a fragment of the embodiment of FIG. 11.

FIG. 11 shows a further alternative embodiment of a filling nozzle according to the invention in a lateral view. FIG. 12 shows a three-dimensional enlarged view of a fragment of the embodiment of FIG. 11. Elements which have already been described in the context of the first and the second embodiment are provided with the same reference signs and are not explained again in detail hereunder. Only the points of differentiation in comparison to the preceding embodiments are to be described hereunder.

The embodiment of FIGS. 11 and 12 has a hand lever 11 which is connected in a rotationally fixed manner to a coupling joint 20'. As opposed to the coupling joint 20 of the embodiment described above, the coupling joint 20' is configured for coming in contact with a rearward portion 31' of the external sleeve 31 when the switching lever 11 is activated. An operative connection between the coupling joint 20' and the coupling installation 30 is thus implemented by way of contact between a front face of the coupling joint 20' and the portion 31' of the external sleeve 31, wherein friction-reducing and/or wear-reducing intermediate elements such as, for example, a sliding bush, may be disposed between the front face of the coupling joint 20' and the portion 31'. As opposed to the other two embodiments, the operative connection does not have any traction hooks.

An elongate bore 23' through which a guide pin 60 which is fixed to the housing 18 is guided is located at the front end of the coupling joint 20'. The coupling joint 20' is rotatable relative to the guide pin 60 and can moreover be displaced relative to the guide pin 60 (and thus relative to the housing 18) along a direction which is predefined by the elongate bore 23'. A restoring element which cannot be seen in the figures urges the external sleeve 31 towards the rear end of the filling nozzle also in this embodiment (in a manner analogous to that of the spring 40 in FIG. 9).

In an activation of the switching lever from the closed position (not shown) to the opened position shown in FIGS. 11 and 12, a rotation of the coupling joint 20' about the axis 41 initially takes place (like in the other embodiments). On account of said rotation, the coupling joint 20' is displaced relative to the housing 18 towards the front end of the filling nozzle. The guide pin within the elongate bore 23' herein moves towards the rear end of the elongate bore 23'. On account of the coupling joint 20' being displaced towards the front, the front face of the coupling joint 20' impacts the portion 31' of the external sleeve 31. On account thereof, the external sleeve 31 counter to the restoring force of the spring 40 is moved to the front end of the filling nozzle such that locking to the connector port 15 takes place (as in the embodiment of FIGS. 8 and 9).

The external sleeve 31 upon locking can no longer be moved further towards the front. A rotation of the coupling joint 20' about the axis of the guide pin 60 therefore takes place in any further activation of the switching lever 11. As has already been described in the context of the other embodiments, said rotation likewise leads to an activation (rotation and displacement) of the articulated lever 22 as well as to a displacement of the valve activation pin 25 in the direction of the first fluid connector 13, as well as to the main valve being opened.

In a closing movement of the hand lever the activation procedures described above take place in a reversed sequence such that no further point of differentiation exists to this extent in comparison to the embodiments already described above.

The invention claimed is:

1. Filling nozzle for delivering a fluid into a tank, said filling nozzle having:
   a. a first fluid connector (13) which is connectable to a fluid infeed line;
   b. a second fluid connector (14) which is connectable to a connector port (15) of the tank;
   c. a duct for directing the fluid from the first fluid connector (13) to the second fluid connector (14);
   d. a main valve which is disposed in the duct;
   e. a coupling installation (30) for establishing a connection between the filling nozzle and the connector port (15); and
   f. an activation device (17) for activating the coupling installation (30) and the main valve, wherein the activation device (17) has a hand lever (11) which is movable between a closed position and an opened position, wherein
   the activation device (17) is specified for converting a movement of the hand lever (11) between the closed position and the opened position to a temporally offset activation of the coupling installation (30) and the main valve, the activation device has a coupling joint (20) which is connected to the hand lever (11) and which by way of a first operative connection is connected to the coupling installation (30) and by way of a second operative connection is connected to the main valve, wherein the operative connections for the coupling joint (20, 20') form a guide such that the coupling joint (20, 20') when activating the hand lever (11) in a first hand lever range is initiated to rotate about a first pivot axis (41) and/or to displace in a first direction, and in that the coupling joint (20, 20') when activating the hand lever (11) in a second hand lever range is initiated to rotate about a second pivot axis (42) and/or to displace in a second direction.

2. Filling nozzle according to claim 1, wherein the operative connections are configured for at least partially converting the rotation of the coupling joint (20, 20') about the first pivot axis (41) and/or the displacement of the coupling joint (20, 20') in the first direction to an activation of the coupling installation (30), and for at least partially converting the rotation of the coupling joint (20, 20') about the second pivot axis and/or the displacement of the coupling joint (20, 20') in the second direction to an activation of the main valve.

3. Filling nozzle according to claim 1, said filling nozzle having means for guiding the coupling joint (20') relative to a housing (18) of the filling nozzle.

4. Filling nozzle according to claim 3, wherein the means have a guide pin (60) which is fixed to the housing and which engages in an elongate bore (23') which is configured in the coupling joint (20').

5. Filling nozzle according to claim 1, wherein at least one of the operative connections has a relaying element (21, 22, 25) which in an articulated manner to the coupling joint (20, 20').

6. Filling nozzle according to claim 5, wherein the relaying element (22, 25) has an activation slide (25) which is displaceable relative to the filling nozzle, as well as a joint element (22) which connects in an articulated manner the coupling joint (20, 20') to the activation slide (25).

7. Filling nozzle according to claim 5, said filling nozzle having an installation (39) which delimits the displacing capability and/or the rotating capability of the relaying element (21, 22, 25) such that the relaying element (21, 22, 25) by a movement of the coupling joint (20, 20') is displaceable and/or rotatable only to a terminal position.

8. Filling nozzle according to claim 7, wherein the coupling joint (20, 20') upon reaching the terminal position is prevented from further rotating about the first or the second pivot axis, and/or is prevented from further displacing along the first or the second direction.

9. Filling nozzle according to claim 5, wherein the relaying element (21, 22, 25) is connected to a restoring element, wherein the restoring element facilitates or impedes pivoting of the coupling element (20, 20') about the first or the second pivot axis.

10. Filling nozzle according to claim 9, wherein the restoring element is configured for urging the main valve to the closed position thereof.

11. Filling nozzle according to claim 5, wherein the relaying element (21, 22, 25) is connected to a restoring element (40), wherein the restoring element (40) facilitates or impedes displacing of the coupling joint (20, 20') in the first or the second direction.

12. Filling nozzle according to claim 5, wherein the relaying element (21, 22, 25) is initiated to displace and/or rotate relative to the filling nozzle by a movement of the coupling joint (20, 20').

13. Filling nozzle according to claim 1, wherein the coupling installation (30) in a displacement of the second fluid connector (14) in the direction of the connector port (15) is configured for establishing automatic locking between the second fluid connector (14) and the connector port (15), wherein the activation device (17) in a movement of the hand lever from the opened position to the closed position is configured for first activating the main valve and for subsequently releasing the locking mechanism between the second fluid connector (14) and the connector port (15).

14. Filling nozzle according to claim 13, wherein the activation device (17) has a latching element (27) which is capable of latching in a counter-latching element (39) of the coupling installation (30).

15. Filling nozzle according to claim 1, wherein the coupling installation (30) is capable of being placed on the connector port by displacing the second fluid connector (14) in the direction of the connector port (15), wherein, upon placing the coupling installation (30) on the connector port (15), the activation device (17) when moving the hand lever from the closed position to the opened position is configured for first establishing a locking mechanism between the second fluid connector (14) and the connector port (15), and for subsequently activating the main valve, in particular for opening the main valve.

16. Filling nozzle according to claim 1, wherein the hand lever (11) and the coupling joint (20, 20') are connected to one another in a rotationally fixed manner.

17. Filling nozzle according to claim 16, the hand lever (11) and the coupling joint (20, 20') are connected to one another in a rotationally fixed and integral manner.

18. Filling nozzle according to claim 1, wherein the coupling installation is configured for establishing a fluid-tight connection between the connector port (15) and the second fluid connector (14), wherein the filling nozzle is configured for pressure fueling the tank.

19. Filling pump for delivering a fluid, characterized in that said filling pump has a filling nozzle according to claim 1.

* * * * *